(12) United States Patent
Arimura

(10) Patent No.: US 7,892,701 B2
(45) Date of Patent: Feb. 22, 2011

(54) FUEL CELL

(75) Inventor: Tomoaki Arimura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 12/485,674

(22) Filed: Jun. 16, 2009

(65) Prior Publication Data

US 2010/0055524 A1 Mar. 4, 2010

(30) Foreign Application Priority Data

Sep. 3, 2008 (JP) ............... 2008-226142

(51) Int. Cl.
- *H01M 4/86* (2006.01)
- *H01M 4/88* (2006.01)
- *H01M 8/02* (2006.01)
- *H01M 8/10* (2006.01)

(52) U.S. Cl. ...................... 429/524; 429/523

(58) Field of Classification Search .............. None
See application file for complete search history.

(56) References Cited

U.S. PATENT DOCUMENTS

| | | | |
|---|---|---|---|
| 3,271,358 A | 9/1966 | Coran et al. | |
| 4,466,868 A | 8/1984 | Gray | |
| 4,614,650 A | 9/1986 | Jansen et al. | |
| 5,709,737 A | 1/1998 | Malhotra et al. | |
| 6,183,914 B1 | 2/2001 | Yao et al. | |
| 6,653,005 B1 | 11/2003 | Muradov | |
| 6,835,495 B2 | 12/2004 | Michot et al. | |
| 7,572,541 B2 | 8/2009 | Arimura | |
| 7,582,376 B2 | 9/2009 | Arimura | |
| 7,585,335 B2 | 9/2009 | Arimura | |
| 7,632,598 B2 | 12/2009 | Arimura | |
| 7,674,548 B2 | 3/2010 | Arimura | |
| 7,736,781 B2 | 6/2010 | Arimura | |
| 2003/0049367 A1 | 3/2003 | Biegert et al. | |
| 2003/0235737 A1 | 12/2003 | Jeon et al. | |
| 2004/0009389 A1 | 1/2004 | Sakai et al. | |
| 2004/0048132 A1 | 3/2004 | Takai et al. | |
| 2004/0161642 A1 | 8/2004 | Hisano et al. | |
| 2004/0166393 A1 | 8/2004 | Akita et al. | |
| 2004/0170886 A1 | 9/2004 | Sakamoto | |

(Continued)

FOREIGN PATENT DOCUMENTS

EP 1625634 2/2006

(Continued)

*Primary Examiner*—Melvin C Mayes
*Assistant Examiner*—Yun Qian
(74) *Attorney, Agent, or Firm*—Blakely, Sokoloff, Taylor & Zafman LLP

(57) ABSTRACT

According to one embodiment, fuel cell includes an anode, into which an aqueous methanol solution is introduced as fuel, includes a current collector and a catalyst layer formed on the current collector, a cathode, into which an oxidizing agent is introduced, includes a current collector and a catalyst layer formed on the current collector, and an electrolyte membrane interposed between the catalyst layer of the anode and the catalyst layer of the cathode. The catalyst layer of at least one of the anode and the cathode contains carbon particles having pores on the surface thereof, catalyst microparticles which are supported by these carbon particles and are finer than the carbon particles, a perfluoroalkylsulfonic acid polymer and a high-molecular compound having a repeating unit of a high-molecular chain fixed to the surface of the carbon particles.

8 Claims, 3 Drawing Sheets

U.S. PATENT DOCUMENTS

| | | |
|---|---|---|
| 2005/0266280 A1 | 12/2005 | Ozeki et al. |
| 2006/0057449 A1 | 3/2006 | Calundann et al. |
| 2006/0068255 A1 | 3/2006 | Arimura |
| 2006/0068256 A1 | 3/2006 | Arimura |
| 2006/0078767 A1 | 4/2006 | Arimura |
| 2006/0105208 A1 | 5/2006 | Sebori et al. |
| 2006/0112613 A1 | 6/2006 | Arimura |
| 2006/0115704 A1 | 6/2006 | Arimura |
| 2006/0141296 A1 | 6/2006 | Arimura |
| 2006/0141297 A1 | 6/2006 | Arimura |
| 2006/0147805 A1 | 7/2006 | Iwayasu et al. |
| 2006/0172163 A1 | 8/2006 | Suh et al. |
| 2006/0177709 A1 | 8/2006 | Nagasaki |
| 2006/0177710 A1 | 8/2006 | Tajima et al. |
| 2006/0177712 A1 | 8/2006 | Hirayama |
| 2006/0177713 A1 | 8/2006 | Tajima et al. |
| 2006/0177724 A1 | 8/2006 | Tajima et al. |
| 2006/0188759 A1 | 8/2006 | Hisano |
| 2006/0228599 A1 | 10/2006 | Takaiwa |
| 2006/0228600 A1 | 10/2006 | Ozeki et al. |
| 2006/0292420 A1 | 12/2006 | Goto et al. |
| 2006/0292421 A1 | 12/2006 | Hirayama |
| 2007/0048567 A1 | 3/2007 | Hisano et al. |
| 2007/0122670 A1 | 5/2007 | Goto |
| 2007/0281189 A1 | 12/2007 | Watanabe et al. |
| 2007/0281191 A1 | 12/2007 | Goto |
| 2008/0026264 A1 | 1/2008 | Watanabe |
| 2008/0063913 A1 | 3/2008 | Hirayama |
| 2010/0216055 A1* | 8/2010 | Arimura .................... 429/524 |

FOREIGN PATENT DOCUMENTS

| | | | |
|---|---|---|---|
| JP | 9110771 | | 4/1997 |
| JP | 2002175838 | | 6/2002 |
| JP | 2004047400 | | 2/2004 |
| JP | 2004127659 | | 4/2004 |
| JP | 2004-207228 | | 7/2004 |
| JP | 2004234947 | * | 8/2004 |
| JP | 2005-327625 | | 11/2005 |
| JP | 2007-149417 | | 6/2007 |
| JP | 2007-179961 | | 7/2007 |
| JP | 2007-242554 | | 9/2007 |
| WO | 9939683 | | 8/1999 |
| WO | WO 2007077972 | | 12/2007 |

* cited by examiner

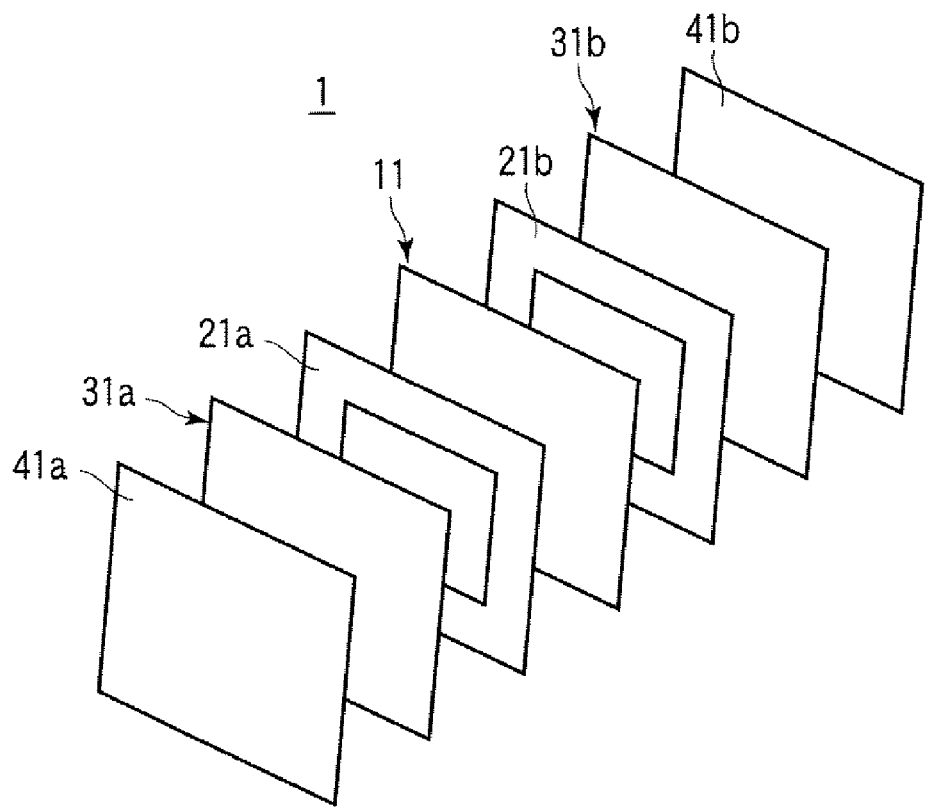
F I G. 1
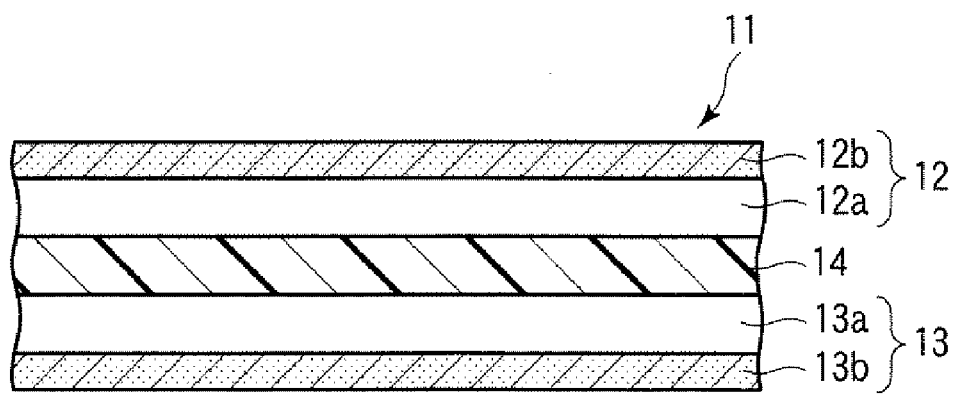
F I G. 2

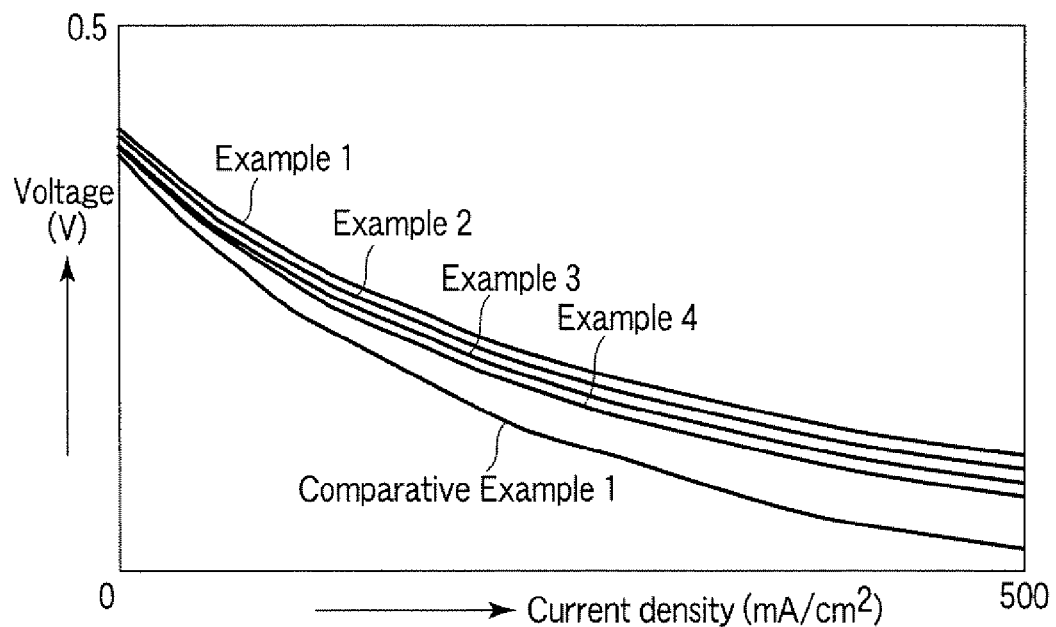
F I G. 3
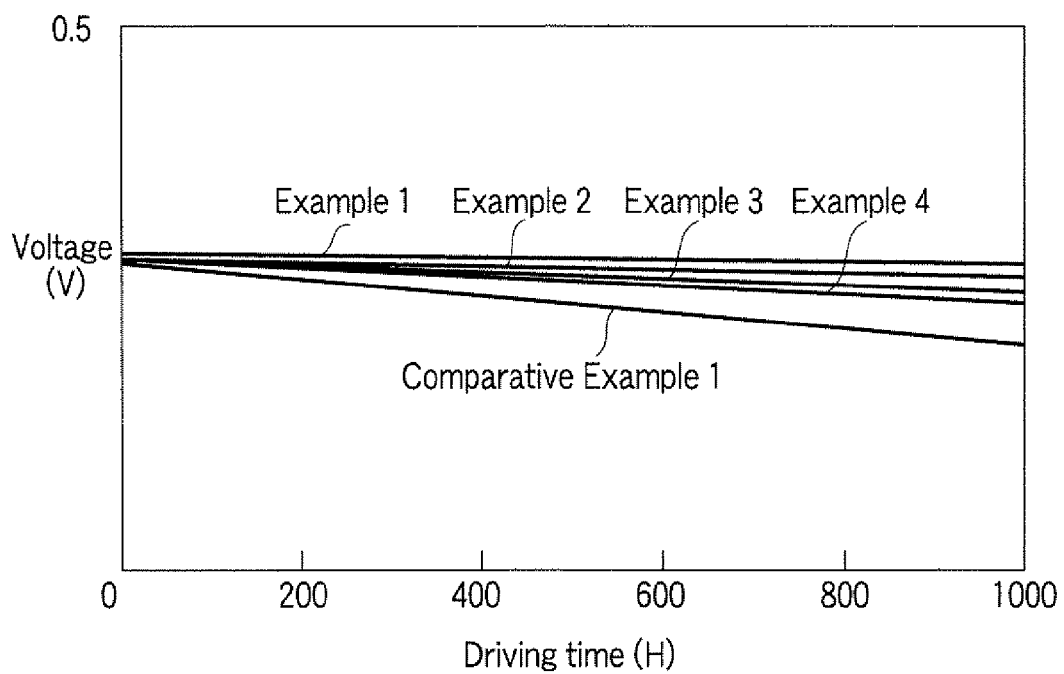
F I G. 4

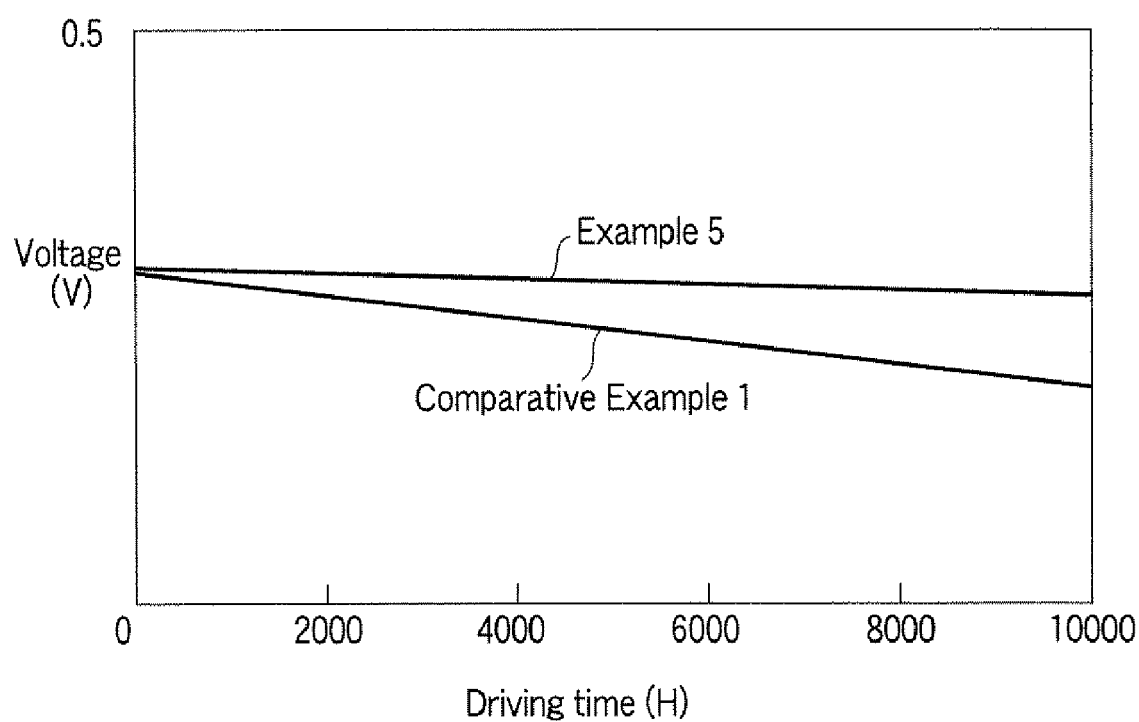
F I G. 5

FUEL CELL

CROSS-REFERENCE TO RELATED APPLICATIONS

This application is based upon and claims the benefit of priority from Japanese Patent Application No. 2008-226142, filed Sep. 3, 2008, the entire contents of which are incorporated herein by reference.

BACKGROUND

1. Field

One embodiment of the present invention relates to a fuel cell.

2. Description of the Related Art

A direct methanol type fuel cell includes an anode into which an aqueous methanol solution is introduced as the fuel, a cathode into which an oxidizing agent is introduced and a proton conductive membrane interposed between the anode and the cathode. Each of the anode and the cathode has a current collector and a catalyst layer formed on this current collector, and the above proton conductive membrane is interposed between these catalyst layers. Each of catalyst layers is formed from a mixture obtained by mixing a catalyst with Nafion (trademark, manufactured by Du Pont) which is a perfluoroalkylsulfonic acid polymer. This Nafion in each of catalyst layers is used as a structural resin for the proton conductive membrane which is an electrolyte film, and has high chemical stability and works to support the catalyst.

Also, each of catalyst layers contains catalyst microparticles of platinum or platinum-ruthenium having a particle diameter of several nanometers together with carbon particles carrying these catalyst microparticles thereon and promotes a redox reaction between methanol and an oxidizer (for example, air).

However, when the catalyst microparticle-carrying carbon particles are exposed to an environment to which an electric field is applied or an environment deficient in fuel, this gives rise to the occurrence of the polarity inversion phenomenon in which the supported catalyst microparticles move to travel around the carbon particles. This brings about a catalytic effect on the carbon particles, with the result that these carbon particles are decomposed into carbon dioxide as shown by the following equation. The carbon particles generally function as a path for electrons produced by the redox reaction of the catalyst microparticles. Therefore, the dissipation of carbon particles resulting from the decomposition thereof is a cause of reduced electricity generation.

$$C + 2H_2O \rightarrow CO_2 + 4H^+ + 4e^-$$

In light of this, an attempt was made to add catalytic-effect microparticles, such as iridium oxide more active to a reaction for electrodialysis of water than to a reaction of the decomposition of carbon, in addition to the catalyst microparticle-carrying carbon particles. However, the added catalytic-effect microparticles cover the surface of the catalyst microparticles to hinder the catalytic activity of the catalyst microparticles. Also, the added catalytic-effect microparticles are eluted and trapped by a sulfonic acid group in a polymer electrolyte membrane constituted of a perfluoroalkylsulfonic acid polymer. This deteriorates the proton conductivity of the polymer electrolyte membrane, resulting in reduced stack output.

In the meantime, Jpn. Pat. Appln. KOKAI Publication No. 2004-207228 discloses a catalyst material used in a fuel cell containing a catalytic metal and a catalyst support (carbon particles) which carries the catalytic metal and is contained an atom, for example, a nitrogen atom capable of binding with the catalytic metal by a covalent bond. However, this catalyst material serves to bind the catalytic metal with the catalyst support by a covalent bond through the nitrogen atom, thereby preventing a reduction in activity along with the growth of the catalytic metal, but not to restrain the decomposition of the carbon particles which are the catalyst support.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exploded perspective view schematically showing a unit cell of a fuel cell according to an embodiment of the present invention.

FIG. 2 is a sectional view showing a film electrode unit incorporated into the unit cell of FIG. 1.

FIG. 3 is a view showing a current-voltage characteristic curve of a unit cell into which an anode and a cathode are incorporated and which is obtained in each of Examples 1 to 4 and Comparative Example 1.

FIG. 4 is a view showing a variation in the voltage of a unit cell for evaluation when the unit cell is operated for a long period of time while keeping a constant current density in each of Examples 1 to 4 and Comparative Example 1.

FIG. 5 is a view showing a variation in the voltage of a unit cell for evaluation when the unit cell is operated for a long period of time (at the time of an acceleration test) while keeping a constant current density in each of Example 5 and Comparative Example 1.

DETAILED DESCRIPTION

Various embodiments according to the invention will be described hereinafter. In general according to one embodiment of the invention, there is provided a fuel cell including: an anode, into which an aqueous methanol solution is introduced as fuel, comprising a current collector and a catalyst layer formed on the current collector; a cathode, into which an oxidizing agent is introduced, comprising a current collector and a catalyst layer formed on the current collector; and an electrolyte membrane interposed between the catalyst layer of the anode and the catalyst layer of the cathode, wherein the catalyst layer of at least one of the anode and the cathode contains carbon particles having pores on the surface of thereof, catalyst microparticles supported by these carbon particles, a perfluoroalkylsulfonic acid polymer and a high-molecular compound having a repeating unit of a high-molecular chain fixed to the surface of the carbon particles, the catalyst microparticles are finer than the carbon particles, and the repeating unit of the high-molecular chain has a redox potential of 1.3 V or more.

A fuel cell according to an embodiment will be explained in detail with reference to FIGS. 1 and 2. FIG. 1 is an exploded perspective view schematically showing a unit cell of the fuel cell, and FIG. 2 is a sectional view showing a film electrode unit incorporated into the unit cell of FIG. 1.

A unit cell 1 is provided with a film electrode unit 11 as shown in FIG. 1. A frame-shaped seal material 21a, a fuel passage plate 31a and a current collector plate 41a are arranged and laminated in this order on one surface of the film electrode unit 11. A frame-shaped seal material 21b, an oxidizing gas passage plate 31b and a current collector plate 41b are arranged and laminated in this order on the other surface of the film electrode unit 11.

As shown in FIG. 2, the film electrode 11 is provided with an anode 12 into which aqueous methanol solution is introduced as fuel, a cathode 13 into which an oxidizing agent is introduced and an electrolyte membrane 14 interposed between the anode 12 and cathode 13. The anode 12 is constituted of a current collector (diffusion layer) 12b made of, for example, carbon paper and a catalyst layer 12a formed on the current collector 12b. The surface of the catalyst 12a formed on the current collector 12b is in contact with the electrolyte membrane 14. The cathode 13 is constituted of a current collector (diffusion layer) 13b made of, for example, carbon paper and a catalyst layer 13a formed on the current collector 13b. The surface of the catalyst 13a formed on the current collector 13b is in contact with the electrolyte membrane 14. Each of the catalyst layers 12a and 13a contains carbon particles having pores on the surface of thereof, catalyst microparticles supported by these carbon particles, a perfluoroalkylsulfonic acid polymer and a high-molecular compound. The catalyst microparticles are finer than the carbon particles. The high-molecular compound is fixed to the surface of the carbon particles and has a repeating unit of a high-molecular chain. The repeating unit of a high-molecular chain has a redox potential of 1.3 V or more. Such a high-molecular compound having a repeating unit of a high-molecular chain preferably has a structure in which it is caused to penetrate into and fixed to the pores of the surface of carbon particles and the high-molecular chain is extended from the surface of the carbon particles.

As the carbon particles in the catalyst layers of the anode and cathode, a carbon powder having an average particle diameter of 0.005 to 0.08 μm such as Kechen Black (trade name, manufactured by Kechen Black International Co., Ltd.) may be used.

Platinum-ruthenium microparticles, for example, may be used as the catalyst microparticles supported by carbon particles in the catalyst layer of the anode. Platinum microparticles, for example, may be used as the catalyst microparticles supported by carbon particles in the catalyst layer of the cathode. These catalyst microparticles are finer than the carbon particles and have an average particle diameter of, for example, 0.5 to 20 nm.

Examples of the repeating unit of a high-molecular chain (redox potential: 1.3 V or more) include an aromatic ether. High-molecular compounds having such the aromatic ether as the repeating unit of a high-molecular chain are represented, for example, by the following formula (I).

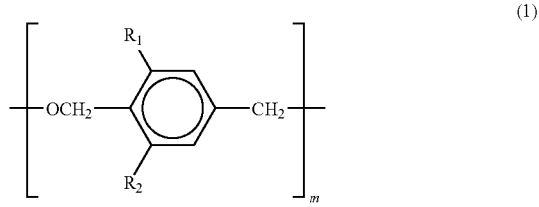

(1)

In the formula (I), $R_1$ and $R_2$, which may be the same or different, respectively represent an alkyl group having 1 to 20 carbon atoms or an alkoxy group having 1 to 20 carbon atoms, and m denotes an integer of 200 to 2500.

In the high-molecular compounds represented by the formula (I), it is preferable that $R_1$ and $R_2$, which may be the same or different, respectively represent an alkyl group having 1 to 8 carbon atoms or an alkoxy group having 1 to 8 carbon atoms. Such an aromatic ether polymer preferably has a weight-average molecular weight (based on polystyrene) of 40000 to 300000. Specific examples of the aromatic ether polymer may include (3,5-dimethyl-4 methyltoluylene ether) polymer shown by structural formula A, below, (3,5-diethyl-4 methyltoluylene ether)polymer shown by structural formula B, below, (3,5-methoxy-4 methyltoluylene ether)polymer shown by structural formula C, below, and (3,5-ethoxy-4 methyltoluylene ether)polymer shown by structural formula D, below.

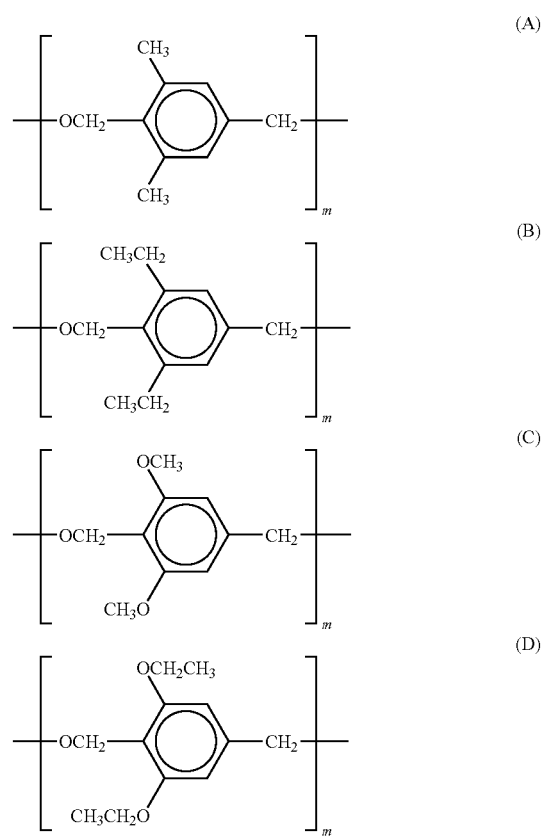

In structural formulas A to D, m denotes an integer of 200 to 2500.

If the amount of the above high-molecular compound having a repeating unit of a high-molecular chain and particularly, an aromatic ether polymer is small when it is fixed to the surface of the carbon particles, it is difficult to restrict the movement of the catalyst microparticles supported by the carbon particles which will be explained later. If the amount of the aromatic ether polymer is large, on the other hand, there is a fear that the aromatic ether polymer exerts an adverse influence on the catalytic effect of the catalyst microparticles. Therefore, the amount of the aromatic ether polymer fixed to the carbon particles is preferably 0.5 to 25% by weight based on the carbon particles.

For example, Nafion (trademark, manufactured by Du Pont.) may be used as the perfluoroalkylsulfonic acid polymer in each catalyst layer of the anode and the cathode.

According to the embodiment explained above, the catalyst layer of at least one of the above anode and cathode contains carbon particles having pores on the surface of thereof, catalyst microparticles which are supported by these carbon particles and are finer than the carbon particles, a perfluoroalkylsulfonic acid polymer and a high-molecular compound having a repeating unit of a high-molecular chain fixed to the surface of the carbon particles, wherein the repeating unit of the high-molecular chain has a redox potential of 1.3 V or more. The high-molecular compound having a repeating unit of a high-molecular chain restricts or prevents the transfer of the catalyst microparticles from the carbon particles in the system in which the catalyst microparticles are supported by the carbon particles. Particularly, the high-molecular compound is made to penetrate into and fixed to the pores on the surface of the carbon particles and the high-molecular chain of the high-molecular compound is extended from the surface of the carbon particles to the catalyst microparticles supported by the carbon particles to thereby limit the movement of the catalyst microparticles supported by the carbon particles efficiently, so that the transfer of the catalyst microparticles from the carbon particles can be limited or prevented in an efficient manner.

Also, since the redox potential of the repeating unit of the high-molecular chain is 1.3 V or more, the high-molecular compound having a repeating unit of a high-molecular chain exists electrochemically stably in an electric field (generally about 1.1 V) taken out between the cathode and the anode and the above effect of limiting the movement of the catalyst microparticles can be maintained for a long period of time.

As a result, the occurrence of the polarity inversion phenomenon in which the supported catalyst microparticles move to travel around the carbon particles can be limited or prevented even if the catalyst layer is exposed to an environment to which an electric field is applied or an environment deficient in fuel. Therefore, such a phenomenon that the carbon particles are decomposed into carbon dioxide by the catalytic effect can be restricted or prevented. Consequently, in the catalyst layers of the anode and cathode, the dissipation of carbon particles which function as a path for electrons produced by the redox reaction promoted by the catalyst microparticles can be limited, a fuel cell which is limited in the deterioration of these electrodes and is therefore improved in electricity generation can be provided.

Particularly, in the case where the above high-molecular compound is an aromatic ether polymer, a hydrophobic bond is generated between the carbon particles and the aromatic ether polymer when this polymer is caused to penetrate into and fixed to pores of the carbon particles. As a result, the ratio of isolated carbon particles existing in the catalyst layer can be reduced and therefore, the efficiency of the electrode reaction between the anode and cathode is increased, making it possible to improve the electricity generation.

Examples of the present invention will be explained in detail.

SYNTHESIS EXAMPLE 1 OF AN AROMATIC ETHER POLYMER 20 parts by weight of chloromethyl-3,5-dimethyl-4 methylsodium oxide was stirred in dry tetrahydrofuran to polymerize. The reaction solution was poured into an aqueous 5 wt % ethanol solution and the resulting solution was dialyzed by a dialyzing tube for 24 hours to carry out desalting/purification, thereby synthesizing (3,5-dimethyl-4 methyltoluylene ether)polymer shown by aforementioned structural formula A.

The weight-average molecular weight of the obtained aromatic ether polymer was 70,000 based on polystyrene in the following test.

Specifically, the obtained aromatic ether polymer was dissolved in N,N-dimethylformamide to prepare a 0.1 wt % solution which was adopted as a sample solution. The sample solution was injected into a Gel Permeation Chromatographitol: "chromatographic instrument" to measure the weight-average molecular weight based on polystyrene.

SYNTHESIS EXAMPLE 2 OF AN AROMATIC ETHER POLYMER 20 parts by weight of chloromethyl-3,5-diethyl-4 methylsodium oxide was stirred in dry tetrahydrofuran to polymerize. The reaction solution was poured into an aqueous 5 wt % ethanol solution and the resulting solution was dialyzed by a dialyzing tube for 24 hours to carry out desalting/purification, thereby synthesizing (3,5-diethyl-4 methyltoluylene ether) polymer shown by aforementioned structural formula B. The weight-average molecular weight of the obtained aromatic ether polymer was 110,000 based on polystyrene in the same test as in Synthesis Example 1.

SYNTHESIS EXAMPLE 3 OF AN AROMATIC ETHER POLYMER 20 parts by weight of chloromethyl-3,5-dimethoxy-4 methylsodium oxide was stirred in dry tetrahydrofuran to polymerize. The reaction solution was poured into an aqueous 5 wt % ethanol solution and the resulting solution was dialyzed by a dialyzing tube for 24 hours to carry out desalting/purification, thereby synthesizing (3,5-methoxy-4 methyltoluylene ether)polymer shown by aforementioned structural formula C. The weight-average molecular weight of the obtained aromatic ether polymer was 160,000 based on polystyrene in the same test as in Synthesis Example 1.

SYNTHESIS EXAMPLE 4 OF AN AROMATIC ETHER POLYMER 20 parts by weight of chloromethyl-3,5-diethoxy-4 methylsodium oxide was stirred in dry tetrahydrofuran to polymerize. The reaction solution was poured into an aqueous 5 wt % ethanol solution and the resulting solution was dialyzed by a dialyzing tube for 24 hours to carry out desalting/purification, thereby synthesizing (3,5-ethoxy-4 methyltoluylene ether)polymer shown by aforementioned structural formula D. The weight-average molecular weight of the obtained aromatic ether polymer was 200,000 based on polystyrene in the same test as in Synthesis Example 1.

EXAMPLE 1

[Production of an Anode]

100 parts by weight of a 5-wt % solution of a perfluoroalkylsulfonic acid polymer (trademark: Nafion, manufactured by Du Pont.) and 20 parts by weight of carbon particles carrying platinum-ruthenium microparticles were mixed and stirred to prepare a slurry. The obtained slurry was applied to carbon paper (trade name: TPG-H-120, manufactured by Toray Industries, Inc.) by a coater to manufacture an anode provided with a catalyst layer in which the amount of platinum ruthenium to be carried was 2 mg/cm$^2$.

[Production of a Cathode]

3 parts by weight of the aromatic ether polymer obtained in the above Synthesis Example 1 were added to 100 parts by weight of an aqueous 1 wt % chloroplatinic acid solution and 10 parts by weight of Kechen Black (trade name, manufactured by Kechen Black International Co., Ltd.) and the mixture was stirred. When the viscosity of the whole solution was increased, 100 parts by weight of an aqueous 5 wt % hydrazine solution was added and the mixture was stirred to make the carbon particles carry platinum. 30 parts by weight of the obtained platinum microparticle-carrying carbon particles and 100 parts by weight of a 5 wt % solution of a perfluoroalkylsulfonic acid polymer (trademark: Nafion, manufactured by Du Pont.) were stirred. The stirring was stopped when the viscosity of the solution was increased, to prepare slurry. The obtained slurry was applied to carbon paper (trade name: TPG-H-120, manufactured by Toray Industries, Inc.) by a coater to manufacture a cathode provided with a catalyst layer in which the amount of platinum to be carried was 1 mg/cm$^2$.

[Production of a Membrane Electrode]

A Nafion 117 (trademark of Du Pont) film was disposed between the obtained anode and cathode as an electrolyte membrane so as to be in contact with each catalyst layer, followed by hot pressing to manufacture a membrane electrode.

[Fabrication of a Unit Cell]

The obtained membrane electrode (electrode area: 5 cm$^2$) was sandwiched between two pairs of carbon separators provided with a column flow passage and current collectors, which was then fastened with a bolt to fabricate a unit cell for evaluation.

EXAMPLE 2

A cathode was manufactured in the same method as in Example 1 except that the aromatic ether polymer of Synthesis Example 2 was used in place of the aromatic ether polymer of Synthesis Example 1.

A Nafion 117 (trademark of Du Pont) film was interposed as an electrolyte membrane between the obtained cathode and the same anode as that of Example 1, followed by thermocompression-molding to manufacture a membrane electrode. This membrane electrode was used to fabricate the same unit cell for evaluation as that of Example 1.

EXAMPLE 3

A cathode was manufactured in the same method as in Example 1 except that the aromatic ether polymer of Synthesis Example 3 was used in place of the aromatic ether polymer of Synthesis Example 1.

A Nafion 117 (trademark of Du Pont) film was interposed as an electrolyte membrane between the obtained cathode and the same anode as that of Example 1, followed by thermocompression-molding to manufacture a membrane electrode. This membrane electrode was used to fabricate the same unit cell for evaluation as that of Example 1.

EXAMPLE 4

A cathode was manufactured in the same method as in Example 1 except that the aromatic ether polymer of Synthesis Example 4 was used in place of the aromatic ether polymer of Synthesis Example 1.

A Nafion 117 (trademark of Du Pont) film was interposed as an electrolyte membrane between the obtained cathode and the same anode as that of Example 1, followed by thermocompression-molding to manufacture a membrane electrode. This membrane electrode was used to fabricate the same unit cell for evaluation as that of Example 1.

EXAMPLE 5

[Production of an Anode]

25 parts by weight of platinum-ruthenium microparticle-carrying carbon particles were dispersed in 100 parts by weight of a 5 wt % solution of a perfluoroalkylsulfonic acid polymer (trademark: Nafion, manufactured by Du Pont.) to prepare a dispersion solution. 10 parts by weight of the aromatic ether polymer of Synthesis Example 1 were added to 100 parts by weight of this dispersion solution and the mixture was stirred to prepare slurry. The obtained slurry was applied to carbon paper (trade name: TPG-H-120, manufactured by Toray Industries, Inc.) by a coater to manufacture an anode provided with a catalyst layer in which the amount of platinum ruthenium to be carried was 2 mg/cm$^2$.

[Production of a Cathode]

10 parts by weight of Kechen Black (trade name, manufactured by Kechen Black International Co., Ltd.) were added to 100 parts by weight of an aqueous 1-wt % chloroplatinic acid solution and the mixture was stirred. When the viscosity of the whole solution was increased, 100 parts by weight of an aqueous 5-wt % hydrazine solution was added and the mixture was stirred to make the carbon particles carry platinum. 30 parts by weight of the obtained platinum microparticle-carrying carbon particles and 100 parts by weight of a 5 wt % solution of a perfluoroalkylsulfonic acid polymer (trademark: Nafion, manufactured by Du Pont.) were stirred. The stirring was stopped when the viscosity of the solution was increased, to prepare slurry. The obtained slurry was applied to carbon paper (trade name: TPG-H-120, manufactured by Toray Industries, Inc.) by a coater to manufacture a cathode provided with a catalyst layer in which the amount of platinum to be carried was 1 mg/cm$^2$.

A Nafion 117 (trademark of Du Pont) film was interposed as an electrolyte membrane between the obtained cathode and anode, followed by thermocompression-molding to manufacture a membrane electrode. This membrane electrode was used to fabricate the same unit cell for evaluation as that of Example 1.

COMPARATIVE EXAMPLE 1

[Production of an Anode]

100 parts by weight of a 5 wt % solution of a perfluoroalkylsulfonic acid polymer (trademark: Nafion, manufactured by Du Pont.) and 2 parts by weight of platinum-ruthenium microparticle-carrying carbon particles were stirred to prepare slurry. The obtained slurry was applied to carbon paper (trade name: TPG-H-120, manufactured by Toray Industries, Inc.) by a coater to manufacture an anode provided with a catalyst layer in which the amount of platinum ruthenium to be carried was 2 mg/cm$^2$.

[Production of a Cathode]

100 parts by weight of a 5 wt % solution of a perfluoroalkylsulfonic acid polymer (trademark: Nafion, manufactured by Du Pont.) and 2 parts by weight of platinum microparticle-carrying carbon particles were stirred to prepare slurry. The obtained slurry was applied to carbon paper (trade name: TPG-H-120, manufactured by Toray Industries, Inc.) by a coater to manufacture a cathode provided with a catalyst layer in which the amount of platinum to be carried was 1 mg/cm$^2$.

A Nafion 117 (trademark of Du Pont) film was interposed as an electrolyte membrane between the obtained anode and cathode so as to be in contact with each catalyst layer, followed by thermocompression-molding to manufacture a membrane electrode. This membrane electrode was used to fabricate the same unit cell for evaluation as that of Example 1.

<Evaluation of a Unit Cell>

Each unit cell of Examples 1 to 4 and Comparative Example 1 was connected to a fuel cell evaluation instrument. An aqueous 3 wt % methanol solution (fuel) was fed to the anode side of the unit cell at a rate of 5 mL/min, and air was fed to the cathode side of the unit cell at a rate of 10 mL/min, to measure the current-voltage characteristic of each unit cell at 50° C. The results are shown in FIG. 3.

As is clear from FIG. 3, it is found that a higher output voltage can be taken out from each unit cell of Examples 1 to 4 as compared with the output voltage from the unit cell of Comparative Example 1.

Also, each unit cell of Examples 1 to 4 and Comparative Example 1 was connected to a fuel cell evaluation instrument. An aqueous 3-wt % methanol solution (fuel) was fed to the anode side of the unit cell at a rate of 5 mL/min, and air was fed to the cathode side of the unit cell at a rate of 10 mL/min, to observe a variation in an electric potential when each sample was operated for 1000 hours while keeping a constant current density of 100 mA/cm$^2$ at 50° C. The results are shown in FIG. 4.

As is clear from FIG. 4, it is found that each unit cell of Examples 1 to 4 exhibits a higher electric potential retentivity than the unit cell of Comparative Example 1 even after a long-term operation, showing the possibility of highly reliable electricity generation.

<Evaluation of a Cell in an Accelerated Test>

First, 5 mL of aqueous hydrogen peroxide and 0.1 g of iron sulfate were added to 100 parts by weight of an aqueous 10 wt % methanol solution and the mixture was stirred to prepare a methanol solution (fuel) containing a radical species.

Then, each unit cell of Example 5 and Comparative Example 1 was connected to a fuel cell evaluation instrument. The above fuel was fed to the anode side of the unit cell at a rate of 5 mL/min, and air was fed to the cathode side of the unit cell at a rate of 10 mL/min, to observe a variation in an electric potential when each sample was operated for 10000 hours while keeping a constant current density of 100 mA/cm$^2$ at 55° C. The results are shown in FIG. 5. This evaluation is made in an acceleration test using a methanol solution containing a radical species as the fuel and therefore, an operation time of 1000 hours corresponds to ten times the usual test, that is, an operation time of 10000 hours.

As is clear from FIG. 5, it is found that the unit cell of Example 5 using an anode provided with a catalyst layer obtained by adding the aromatic ether polymer of Synthesis Example 1 to the platinum-ruthenium microparticle-carrying carbon particles exhibits a higher electric potential retentivity than the unit cell of Comparative Example 1 even after a long-term operation, so that the unit cell can attain highly reliable electricity generation.

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A fuel cell comprising: an anode, into which an aqueous methanol solution is introduced as fuel, comprising a current collector and a catalyst layer formed on the current collector; a cathode, into which an oxidizing agent is introduced, comprising a current collector and a catalyst layer formed on the current collector; and an electrolyte membrane interposed between the catalyst layer of the anode and the catalyst layer of the cathode, wherein the catalyst layer of at least one of the anode and the cathode contains carbon particles having pores on the surface thereof, catalyst microparticles supported by these carbon particles, a perfluoroalkylsulfonic acid polymer and a high-molecular weight polymer fixed to the surface of the carbon particles, the high-molecular weight polymer being represented by the following formula (I), and the catalyst microparticles are finer than the carbon particles,

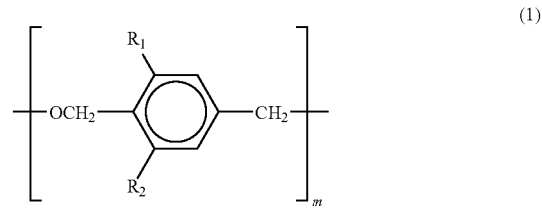

where R1 and R2, which may be the same or different, respectively represent an alkyl group having 1 to 20 carbon atoms or an alkoxy group having 1 to 20 carbon atoms, and m denotes an integer of 200 to 2500.

2. The fuel cell of claim 1, wherein the carbon particles have an average particle diameter of 0.005 to 0.08 μm.

3. The fuel cell of claim 1, wherein the catalyst microparticles in the catalyst layer of the cathode are platinum.

4. The fuel cell of claim 1, wherein R1 and R2 in formula (I), which may be the same or different, respectively represent an alkyl group having 1 to 8 carbon atoms or an alkoxy group having 1 to 8 carbon atoms.

5. The fuel cell of claim 1, wherein the high-molecular weight polymer represented by formula (I) is a (3,5-dimethyl-4 methyltoluylene ether)polymer.

6. The fuel cell of claim 1, wherein the high-molecular weight polymer represented by formula (I) is a (3,5-diethyl-4 methyltoluylene ether)polymer.

7. The fuel cell of claim 1, wherein the high-molecular weight polymer represented by formula (I) is a (3,5-methoxy-4 methyltoluylene ether)polymer.

8. The fuel cell of claim 1, wherein the high-molecular weight polymer represented by formula (I) is a (3,5-ethoxy-4 methyltoluylene ether)polymer.

* * * * *